US009486986B2

(12) United States Patent
Yamanaka et al.

(10) Patent No.: US 9,486,986 B2
(45) Date of Patent: Nov. 8, 2016

(54) MULTILAYERED-STRETCHED RESIN FILM

(75) Inventors: Masaaki Yamanaka, Kashima-gun (JP); Kazuyuki Kimura, Kashima-gun (JP)

(73) Assignee: YUPO CORPORATION, Tokyo (JP)

( * ) Notice: Subject to any disclaimer, the term of this patent is extended or adjusted under 35 U.S.C. 154(b) by 139 days.

(21) Appl. No.: 11/555,912

(22) Filed: Nov. 2, 2006

(65) Prior Publication Data
US 2007/0054111 A1 Mar. 8, 2007

Related U.S. Application Data

(63) Continuation of application No. 10/392,812, filed on Mar. 21, 2003, now abandoned, which is a continuation of application No. PCT/JP01/08100, filed on Sep. 18, 2001.

(51) Int. Cl.
*B32B 3/26* (2006.01)
*B32B 7/12* (2006.01)
*B32B 27/32* (2006.01)
*B32B 3/30* (2006.01)
*B32B 27/08* (2006.01)
*B32B 27/16* (2006.01)
*B32B 27/18* (2006.01)
*B32B 27/20* (2006.01)
*B32B 27/30* (2006.01)
*B32B 27/34* (2006.01)
*B32B 27/36* (2006.01)

(52) U.S. Cl.
CPC .............. *B32B 27/32* (2013.01); *B32B 3/26* (2013.01); *B32B 3/30* (2013.01); *B32B 27/08* (2013.01); *B32B 27/16* (2013.01); *B32B 27/18* (2013.01); *B32B 27/20* (2013.01); *B32B 27/306* (2013.01); *B32B 27/308* (2013.01); *B32B 27/34* (2013.01); *B32B 27/36* (2013.01); *B32B 2264/10* (2013.01); *B32B 2274/00* (2013.01); *B32B 2307/21* (2013.01); *B32B 2307/402* (2013.01); *B32B 2307/5825* (2013.01); *B32B 2307/72* (2013.01); *B32B 2307/726* (2013.01); *B32B 2307/728* (2013.01); *B32B 2307/732* (2013.01); *B32B 2307/75* (2013.01); *B32B 2607/02* (2013.01); *Y10T 428/249953* (2015.04); *Y10T 428/25* (2015.01); *Y10T 428/28* (2015.01)

(58) Field of Classification Search
CPC .......... B32B 3/26; B32B 27/08; B32B 27/16
USPC ................................ 428/304.4, 316.6, 317.1
See application file for complete search history.

(56) References Cited

U.S. PATENT DOCUMENTS

| 5,422,175 A | 6/1995 | Ito et al. |
| 5,853,638 A | 12/1998 | Han |
| 6,623,841 B1 * | 9/2003 | Venkatasanthanam et al. ........................ 428/195.1 |
| 2003/0017321 A1 * | 1/2003 | Iwasa et al. ............... 428/308.4 |

FOREIGN PATENT DOCUMENTS

| EP | 1 097 805 | | 5/2001 |
| EP | 1097805 A1 | * | 5/2001 |
| JP | 08302218 A | * | 11/1996 |
| WO | 99/59813 | | 11/1999 |
| WO | WO 9959813 A1 | * | 11/1999 |
| WO | WO 0142340 A1 | * | 6/2001 |

OTHER PUBLICATIONS

English acstract of JP 08-302218, see above for date and inventor.*

* cited by examiner

*Primary Examiner* — Victor Chang
(74) *Attorney, Agent, or Firm* — Oblon, McClelland, Maier & Neustadt, L.L.P

(57) ABSTRACT

Disclosed is a multilayered-stretched resin film characterized in that on the back surface of a printable front layer (A) comprising a thermoplastic resin, an inorganic finepowder, and/or an organic filler is laminated a back layer (B) comprising a surface-treated inorganic finepowder and a thermoplastic resin comprising a hydrophilic thermoplastic resin, and in that the peel strength of back layer (B) is from 10 to 200 g/cm.
The multilayered-stretched resin film affords good suitability for printing and embossing, that can be directly adhered to a wall or the like using a water-soluble adhesive without necessitating a backing of natural paper required by conventional wallpapers, and that can be readily peeled off the wall in a manner permitting recycling.

22 Claims, No Drawings

MULTILAYERED-STRETCHED RESIN FILM

TECHNICAL FIELD

The present invention relates to a multilayered-stretched resin film that is useful as an interior design material. More particularly, the present invention relates to a multilayered-stretched resin film affording good suitability for printing and embossing, that can be directly adhered to a wall or the like using a water-soluble adhesive without necessitating a backing of natural paper required by conventional wallpapers, and that can be readily peeled off the wall in a manner permitting recycling.

BACKGROUND ART

Various kinds of paste-foamed materials and calendered films comprising mainly of polyvinyl chloride (PVC) resin have conventionally been employed as resin films for interior decoration materials (especially wallpaper). Wallpapers employing these PVC resins have problems in that chloride gas is generated when the wallpaper is disposed or in fires and environmental pollutions such as an indoor pollution is caused due to bleeding of the plasticizer. Thus, to solve these problems, wallpaper films employing polyolefin and paste-foaming methods employing polyolefin resin have recently been developed.

Further, in order to utilize these resin films as wallpapers, various materials have been provided as backing on the back side of the resin film or, in the case of tack paper-type wallpaper, a pressure sensitive adhesive or the like is applied. When applied directly to the wall or gypsum board, an adhesive (or paste) has conventionally been applied. Natural paper has typically been employed as the backing material since it shows good adhesiveness (strength) to adhesives and agglutinants, and is easy to dry. However, when natural paper of a composition differing from that of the resin material in the wallpaper is employed as backing, there is a problem in that wallpaper that is peeled-off for replacement cannot be recycled as is. Before recycling, the resin material and the paper backing must be separated. This separation is difficult and has proved to be problematic.

In tack paper-type wallpaper having a pressure-sensitive adhesive comprising a synthetic resin as a main component on its back side, it is also difficult to separate the pressure-sensitive adhesive from the resin material. Thus, if it is tried, a large quantity of pressure-sensitive adhesive remains adhering to the resin material. During recycling, the resin material with the pressure-sensitive adhesive undergoes heat decomposition and generates extraneous substances, and the fluidity of the resin changes greatly. These changes cause a quality problem.

Recently, to solve these problems, wallpapers devised to permit the separation of the wallpaper resin material and the backing (natural paper) have been proposed. For example, Japanese Unexamined Patent Publication (KOKAI) Heisei No. 6-173200 proposes a wallpaper that is obtained by forming a coating layer mainly comprising water-soluble polymer and a PVC resin-based or vinyl acetate-based synthetic binder on backing paper and laminating PVC resin thereon. The PVC resin can be separated from the backing paper by soaking the wallpaper in a hot water or an alkaline solution with stirring. Japanese Unexamined Patent Publication (KOKAI) Heisei No. 11-293600 proposes a wallpaper in which a PET film, PP film, or the like is laminated between the backing paper and a foam gelled PVC material. However, since there needs an additional step of separating the backing paper when using either of these wallpapers, there are problems in that the cost of recycling is increased and in that the quality of the recycled resin material drops, rendering these wallpapers impractical. Thus, disposed wallpaper is still being mostly buried or incinerated, and not recycled.

In light of these problems of prior art, the present invention has for its object to provide a multilayered-stretched resin film affording good suitability for printing and embossing, having good coating properties without backing paper or pressure-sensitive adhesive processing, peeling easily off the wall or board in a recyclable manner, and being useful as a single-material wallpaper.

DISCLOSURE OF THE INVENTION

As a result of extensive research, the present inventors discovered that employing a hydrophilic thermoplastic resin in the back layer and adjusting the peel strength and water-absorption volume of the back layer to within prescribed ranges made it possible to obtain a film having good characteristics achieving the desired results; the present invention was devised on that basis.

That is, the present invention provides a multilayered-stretched resin film characterized in that on the back surface of a printable front layer (A) comprising a thermoplastic resin, an inorganic finepowder, and/or an organic filler is laminated a back layer (B) comprising a surface-treated inorganic finepowder and a thermoplastic resin comprising a hydrophilic thermoplastic resin, and in that the peel strength of back layer (B) is from 10 to 200 g/cm.

In preferred implementation modes of the present invention, back layer (B) comprises from 3 to 200 weight parts of hydrophilic thermoplastic resin per 100 weight parts of nonhydrophilic thermoplastic resin. Further, the thermoplastic resin is desirably an olefin-based resin, olefin-based thermoplastic elastomer, or a mixture thereof. The olefin thermoplastic elastomer employed desirably has a melting point of greater than or equal to 160° C. In particular, from 10 to 300 weight parts of olefin-based thermoplastic elastomer are desirably incorporated per 100 weight parts of olefin-based resin. The hydrophilic thermoplastic resin is desirably an alkylene oxide polymer. Further, the outer surface of the inorganic finepowder employed in back layer (B) is desirably treated with at least one selected from the group consisting of anionic surfactants, cationic surfactants, nonionic surfactants, and antistatic agents. The liquid water-absorption volume of back layer (B) is desirably from 6 to 50 mL/m$^2$ as measured by Japan TAPPI No. 51-87.

The porosity of the multilayered-stretched resin film of the present invention is desirably from 10 to 60 percent, and the porosity of back layer (B) is desirably greater than that of front layer (A). The average contact angle of water is desirably from 10 to 80°. The density of the multilayered-stretched resin film of the present invention is desirably from 0.4 to 1 g/cm$^3$. The multilayered-stretched resin film is desirably stretched after laminating front layer (A) and back layer (B), with uniaxial stretching being preferred. Front layer (A) and back layer (B) are also desirably subjected to oxidation treatment.

Front layer (A) is desirably embossed following printing. In particular, it is desirable for a water-soluble adhesive to be directly coated on back layer (B), and for the wallpaper to be adhered to the wall. The water-soluble adhesive employed on back layer (B) is desirably at least one selected from the group consisting of starch, polyacrylic acid, polyacrylamide, polyethylene oxide, polyvinyl alcohol, carboxymethyl cellulose, vinyl acetate, and polyvinyl amide.

DETAILED DESCRIPTION OF THE INVENTION

The multilayered-stretched resin film of the present invention is described in detail below. In the present specification, ranges indicated with "to" mean ranges including the numerical values before and after "-" as the minimum and maximum values.

The multilayered-stretched resin film of the present invention comprises at least a front layer (A) and a back layer (B). Front layer (A) comprises a thermoplastic resin, an inorganic finepowder, and/or an organic filler. Back layer (B) comprises thermoplastic resin comprising a hydrophilic thermoplastic resin, and a surface-treated inorganic finepowder. Front layer (A) and back layer (B) desirably comprise thermoplastic resin as an olefin-based thermoplastic elastomer.

Configuration of Front Layer (A)

Front layer (A) of the multilayered-stretched resin film of the present invention can be printed in a variety of manners and then treated by embossing or the like. The application of such a treatment permits the useful application of the multilayered-stretched resin film of the present invention as wallpaper or the like. Based on the use of the multilayered-stretched resin film, front layer (A) can be configured to be suitable to various high-precision printing by a variety of printing methods, and have adequate adhesive strength to hold ink during embossing following printing.

The thermoplastic resin employed in front layer (A) is not specifically limited. The thermoplastic resin of preference incorporates an olefin-based thermoplastic elastomer as the thermoplastic resin. So long as an olefin-based thermoplastic elastomer is incorporated, neither the type nor composition of the other resins contained in the front layer (A) are specifically limited.

Olefin-based resins are employed with preference in addition to the olefin-based thermoplastic elastomer. Specific examples are ethylene, propylene, 1-butene, 1-hexene, 1-heptene, 1-octene, 4-methyl-1-pentene, 3-methyl-1-pentene, and other homopolymers of alpha-olefin having 2 to 8 carbon atoms, as well as copolymers comprising from 2 to 5 kinds of these alpha-olefins. The copolymers may be random copolymers or block copolymers. Specific examples are branched ethylene, linear polyethylene, high-density polyethylene, and linear low-density polyethylene with a density of from 0.89 to 0.97 g/cm$^3$ and a melt flow rate (190° C., 2.16 kg load) of from 1 to 10 g/10 min; propylene homopolymer, propylene ethylene copolymer, propylene 1-butene copolymer, propylene ethylene 1-butene copolymer, propylene 4-methyl-1-pentene copolymer, propylene 3-methyl-1-pentene copolymer, poly(1-butene), poly(4-methyl-1-pentene), and propylene ethylene 3-methyl-1-pentene copolymer with a melt flow rate (230° C., 2.16 kg load) of from 0.2 to 20 g/10 min.

Of these, propylene homopolymers, propylene ethylene random copolymers, high-density polyethylene, and linear low-density polyethylene are preferred because they are inexpensive and afford good molding properties.

An olefin-based thermoplastic elastomer in the form of a compound material comprised of olefin-based elastomer and olefin-based resin is desirably employed as the thermoplastic resin in front layer (A). In particular, three preferred examples are given below:

(1) a mixture prepared by simply blending an olefin-based elastomer as a soft segment and an olefin-based elastomer as a hard segment;

(2) a compound combined by partially crosslinking or polymerizing an olefin-based elastomer and an olefin based resin; and (3) a compound obtained by crosslinking an olefin-based elastomer and dispersing it in an olefin-based resin.

Ethylene-based rubbers typified by EPDM are examples of the above-described olefin-based elastomers. Examples of olefin-based resins are polyethylene and propylene-based resins.

The melting point (DSC peak temperature) of the olefin-based thermoplastic elastomer employed in front layer (A) and back layer (B) is desirably greater than or equal to 160° C., preferably from 165 to 180° C. When an olefin-based thermoplastic elastomer having such a desired melting point is employed, front layer (A) is imparted with good suitability for embossing, the film rigidity required for application to the wall surface, and flexibility to absorb unevenness on the wall surface following application. Further, it becomes easy to ensure that the porosity of back layer (B) is greater than that of front layer (A) so that peeling starts in back layer (B).

Additives such as coloring pigments, flame retardants, oxidation inhibitors, dispersing agents, mildew-combatting agents, antibacterial agents, and UV-stabilizers may be added as needed to the above-described olefin-based thermoplastic elastomer and thermoplastic resin.

In the present invention, the above-described olefin-based thermoplastic elastomers may be employed singly or in combinations of two or more.

From 10 to 300, preferably from 20 to 80, weight parts of the olefin-based thermoplastic elastomer are desirably incorporated per 100 weight parts of olefin-based resin into front layer (A).

An inorganic finepowder and/or an organic filler are employed in front layer (A).

The type of inorganic finepowder is not specifically limited. However, examples are heavy calcium carbonate, light calcium carbonate, clay, talc, titanium dioxide, barium sulfate, zinc oxide, magnesium oxide, diatomaceous earth, and silicon oxide with an average particle diameter of from 0.1 to 3 micrometers. Of these, light and heavy calcium carbonate, clay, diatomaceous earth, and titanium dioxide are preferred due to low cost and good formability of voids generated during shaping by stretching.

The type of organic filler is not specifically limited. However, a resin differing from the main component thermoplastic resin and having an average particle diameter of from 0.1 to 3 micrometers following dispersion is desirable. For example, when the thermoplastic resin film is an olefin-based resin film, examples of the organic filler are polyethylene terephthalate, polybutylene terephthalate, polycarbonate, nylon 6, nylon 6,6, cyclic olefin homopolymers, and copolymers of cyclic olefin and ethylene, with a melting point of from 120 to 300° C. or a glass transition temperature of from 120 to 280° C.

Dispersing agents, oxidation inhibitors, UV-stabilizers, and compatibility-enhancing agents are desirably added in the course of blending and kneading these organic fillers into the olefin-based resins. The quantity and type of compatibility-enhancing agent selected is particularly important because it determines the shape of the particles of the organic filler.

An inorganic finepowder or organic filler containing coarse particles exceeding 44 micrometers in as small amount as possible is desirably selected to prevent voids during printing. The use in front layer (A) of an inorganic finepowder or organic filler having an average particle diameter smaller than the inorganic finepowder or organic filler employed in back layer (B) makes it possible that the amount of the voids generated during stretching in front layer (A) are smaller than that in back layer (B). This constitution enables improved surface strength and high-precision printing, and this constitution also permits the elimination of failed surface peeling and the like when employed as wallpaper and improves manufacturing properties by permitting embossing at lower temperature.

Just one from among the above-described inorganic finepowders and organic fillers may be selected for use, or two or more may be employed in combination in front layer (A). When employing two or more, it is possible to mix an inorganic finepowder with an organic filler for use.

It is particularly desirable that front layer (A) comprises 10 to 60 weight percent of organic filler and/or inorganic finepowder having an average particle diameter of from 0.1 to 3 micrometers and 40 to 90 weight percent of the mixture of olefin-based resin and olefin-based thermoplastic elastomer in front layer (A).

In case the quantity of inorganic finepowder and/or organic filler is less than 10 weight percent, ink adhesion tends to deteriorate. In case 60 weight percent is exceeded, uniform stretching becomes difficult, tears occur in the surface of the stretched film, and practical use tends to be precluded. In case the average particle diameter of the inorganic finepowder and/or organic filler is less than 0.1 micrometer, secondary aggregation occurs due to poor dispersion in the thermoplastic resin, numerous protrusions are present on the surface, and high-precision printing tends to be precluded. In case 3 micrometers are exceeded, the flatness of the surface decreases and, similarly, high-precision printing tends to be precluded.

In case the multilayered-stretched resin film of the present invention is applied as wallpaper or it is desired to inhibit decrease over time in the strength of an applied durable material and decrease over time in the adhesive strength of the printed ink, it is preferred that oxidation inhibitors, UV-stabilizers, titanium dioxide, or the like is added to front layer (A).

Configuration of Back Layer (B)

Back layer (B) of the multilayered-stretched resin film of the present invention comprises a thermoplastic resin containing a hydrophilic thermoplastic resin, and surface-treated inorganic finepowder. The peel strength of back layer (B) is desirably from 10 to 200 g/cm, preferably from 20 to 160 g/cm, and more preferably from 30 to 150 g/cm. The liquid water-absorption volume of back layer (B) is desirably from 6 to 50 mL/m$^2$, preferably from 10 to 45 mL/m$^2$, and more preferably from 14 to 40 mL/m$^2$.

A back layer (B) having the above-stated characteristics can be readily embossed to impart a sense of perspective. Further, back layer (B) affords good drying of the adhesive when a water-soluble adhesive is applied and is well-suited to application with good adhesion to the wall, board, or the like. Thus, the application of a water-soluble adhesive to back layer (B) permits the application of the multilayered-stretched resin film of the present invention directly to the wall or the like. When peeling the multilayered-stretched resin film of the present invention once it has been applied, some of the material of back layer (B) and the adhesive remain on the wall or the like, facilitating recycling. This advantage permits the useful application of the multilayered-stretched resin film of the present invention as wallpaper or the like.

A hydrophilic thermoplastic resin is employed in back layer (B) of the multilayered-stretched resin film of the present invention. The "hydrophilic thermoplastic resin" referred to here is one that dissolves to a water at a room temperature within 30 minutes, or has a water-absorption factor at a room temperature of greater than 3 g/g, preferably from 5 to 50 g/g. The terminology "water-absorption factor" is determined by dividing the weight after the water absorption by the weight prior to the water absorption. The water-absorption is carried out by molding hydrophilic thermoplastic resin through a T-die connected to an extruder or hot press to a thickness of about 0.1 mm to obtain a sheet, and soaking the sheet in distilled water for 30 min at room temperature, for example, at 25° C. to absorb water. In the present specification, thermoplastic resins that do not satisfy such conditions are referred to as nonhydrophilic thermoplastic resins. Further, in the present specification, the term "thermoplastic resin" is a concept encompassing both hydrophilic thermoplastic resins and nonhydrophilic thermoplastic resins.

Examples of hydrophilic thermoplastic resins suitable for use in back layer (B) are: polyvinyl resins such as polyvinyl alcohol and polymers and crosslinked products thereof, and polyvinyl pyrrolidone and polymers thereof; polymers and crosslinked products of esters of maleic acid, methacrylic acid, and acrylic acid having hydroxyalkyl groups such as 2-hydroxyethyl group and 2-hydroxypropyl group, poly-acryl amides and their polymers, hydrolytes of polymers and crosslinked polymers of acrylonitriles, polyacrylic-based resins such as polymers and copolymers of acrylic acid and methacrylic acid, salts thereof (such as sodium salts, potassium salts, lithium salts, and primary-quaternary ammonium salts), and hydrolytes of copolymers of vinyl acetate and methyl methacrylate; water-soluble nylon; urethane resins (such as water-soluble polyurethane, highly water absorptive polyurethane, thermoplastic polyurethane); polyalkylene oxide resins such as polyethylene oxide and polymers thereof and polypropylene oxide and polymers thereof; polyether amide, polyether ester amide; polyvinyl amine, polyallyl amine, and polymers thereof.

Of these, the compounds of preference are polyalkylene oxide polymers and polyether ester amides due to their high water absorption and the ease of film molding.

The nonhydrophilic thermoplastic resin employed in back layer (B) is not specifically limited. For example, the olefin-based resins and thermoplastic elastomers described for front layer (A) above may also be employed in back layer (B). The nonhydrophilic thermoplastic resin employed in back layer (B) may be identical to, or different from, that employed in front layer (A).

The blending ratio when mixing the hydrophilic thermoplastic resin and the nonhydrophilic thermoplastic resin is desirably from 3 to 200 weight parts, preferably from 5 to 100 weight parts, of hydrophilic thermoplastic resin per 100 weight parts of nonhydrophilic thermoplastic resin to achieve film formability, stretching properties, and water absorption.

To prevent the deterioration over time of the multilayered-stretched resin film as a durable material, oxidation inhibitors and UV stabilizers are desirably added to back layer (B). Flame retardants may also be added as needed.

A surface-treated inorganic finepowder is employed in back layer (B). For example, surface-treated inorganic finepowders are obtained by treating heavy calcium carbonate with a water-soluble anionic, cationic, or nonionic surfactant having an average molecular weight of from 1,000 to 150,000 during wet comminution; treating heavy calcium carbonate with an anionic, cationic, or nonionic antistatic agent during wet comminution; and treating heavy calcium carbonate in two stages with the above-listed surfactants and antistatic agents.

The average contact angle of water of back layer (B) is desirably from 10 to 80°, preferably from 15 to 65°, and more preferably from 20 to 50°. The use of a finepowder obtained by treating a finepowder having an average particle diameter of from 0.5 to 10 micrometers in a two-stage treatment with a surfactant and antistatic agent to achieve such a desirable hydrophilic surface is particularly desirable.

An inorganic finepowder and/or an organic filler that have not been surface treated may be employed in combination with the surface-treated inorganic finepowder in back layer (B). The types of inorganic finepowders and/or organic fillers that can be employed in back layer (B) are not specifically limited; they may be suitably selected for use from among the inorganic finepowders and organic fillers described above as being suitable for use in front layer (A). Either the inorganic finepowder or organic filler may be employed singly or in combinations of two or more. When employed in a combination of two or more, the inorganic finepowder and organic filler may be employed in combination.

The porosity of the multilayered-stretched resin film of the present invention is desirably from 10 to 60 percent. To achieve a porosity falling within the desired range, the quantity of surface-treated inorganic finepowder of back layer (B) desirably falls within a range of from 30 to 70 percent by weight, preferably 35 to 65 percent by weight.

When the surface-treated inorganic finepowder is employed at less than 30 weight percent and the average particle diameter of the surface-treated inorganic finepowder is less than 0.5 micrometer, less voids are generated, tending to result in poor suitability for embossing (application of embossing). Further, the ability of the wallpaper to conceal is inadequate, the texture of the wall is visible, flexibility is inadequate in a manner rendering irregularities on the while conspicuous, and there is a tendency not to achieve a sense of quality. High water absorption also tends not to be achieved.

When either the surface-treated inorganic finepowder exceeds 70 weight percent or the average particle diameter is greater or equal to 10 micrometers, it becomes difficult to achieve uniform stretching and tears tend to appear in the surface of the film obtained by stretching.

The peel strength of back layer (B) is from 10 to 200 g/cm, preferably from 20 to 160 g/cm. When the peel strength is less than 10 g/cm, separation tends to occur during or following the hanging of wallpaper, which is impractical. When 200 g/cm is exceeded, peeling from the back layer (B) portion is precluded, compromising recycling and rehanging properties.

The porosity of back layer (B) is desirably greater than that of front layer (A). Making the porosity of back layer (B) greater allows easy peeling from the back layer (B) portion when peeling off the wall a multilayered-stretched resin film that has been applied to a wall.

When either the liquid water-absorption volume of back layer (B) as measured by the Japan TAPPI No. 51-87 exceeds 50 mL/m² or the contact angle of water is less than 10°, the water absorption rate becomes excessively high. Thus, when a water-soluble adhesive is employed, there is a tendency for a large amount of the adhesive component to penetrate into the interior. Thus, the cost of application tends to rise because of the larger quantity of adhesive that must be applied. Further, there is a tendency that drying of the adhesive occurs prior to hanging on the wall and thereby hanging becomes difficult.

When either the liquid absorption volume is less than 6 mL/m² or the average contact angle of water exceeds 80°, the water absorption rate tends to decrease and the adhesive tends to dry slowly. Thus, wallpaper that has been hung on the wall tends to bulge and curl, tending to greatly compromise the ease of application. Further, since little adhesive component impregnates the film, adhesion between the adhesive and the multilayered-stretched resin film tends to diminish.

Other Layers

So long as the multilayered-stretched resin film of the present invention comprises front layer (A) and back layer (B) satisfying the conditions of the present invention, it may also comprise other layers. For example, one or more intermediate layers (C) may be provided between front layer (A) and back layer (B).

Considering embossing applicability, intermediate layer (C) desirably has a porosity roughly identical to that of back layer (B). However, to prevent peeling from starting in intermediate layer (C) when peeling the wallpaper from the wall surface or the like, the porosities of the individual layers desirably satisfy the following relations:

Back layer (B)>intermediate layer (C)>front layer (A)

Further, the difference in porosity between back layer (B) and front layer (A) is desirably greater than or equal to 20 percent.

The thickness of the multilayered-stretched resin film of the present invention is desirably from 30 to 500 micrometers, preferably from 40 to 400 micrometers. It is possible to achieve a thickness of over 1 mm by adhesion with various adhesives.

A ratio of thickness (A)/(B) of front layer (A) to back layer (B) of (1 to 7)/(9 to 3) is desirable from the perspectives of film strength, suitability for printing, ease of embossing, and embossing reversion. When the thickness ratio of back layer (B) is less than 30 percent, the embossing tends not to take hold. Further, the amount of water-soluble adhesive absorbed is inadequate, causing the adhesive to tend to dry poorly. When an intermediate layer (C) is provided, it is desirable to include the thickness of layer (C) together with that of back layer (B) when weighing these considerations.

Manufacturing and Processing of the Multilayered-Stretched Resin Film

The multilayered-stretched resin film of the present invention can be manufactured by combining various methods known to those skilled in the art. A multilayered-stretched resin film manufactured by any method is covered by the scope of the present invention so long as it satisfies the conditions described in claim 1.

The multilayered-stretched resin film of the present invention may be manufactured by first separately stretching front layer (A) and back layer (B) and then laminating them, or may be manufactured by first laminating front layer (A) and back layer (B) and them stretching them together. When intermediate layer (C) is present, the three layers may be first separately stretched and then laminated, or first laminated and then collectively stretched. Alternatively, front layer (A) and intermediate layer (C) may be first laminated and stretched, after which stretched or unstretched back layer (B) may be laminated. These methods may also be suitably combined.

The preferred manufacturing method is to first laminate front layer (A) and back layer (B), followed by collective stretching. When intermediate layer (C) is present, front layer (A), intermediate layer (C), and back layer (B) are desirably first laminated and then collectively stretched. This is simpler and less expensive than separately stretching each of the layers followed by lamination. Further, it is easier to control the voids formed in front layer (A) and back layer (B).

Various known methods of stretching may be employed. Examples of specific methods of stretching include roll stretching exploiting the difference in peripheral speed of a group of rolls, and clip stretching in a tenter oven. Of these, uniaxial roll stretching is preferred because is permits the adjustment of the stretching factor to any level and permits controlling the size and number of voids that are formed. Since the stretching orientation of the resin is made the longitudinal direction of the film, there is greater tensile strength than in unstretched films, making it possible to achieve multilayered-stretched resin films undergoing less dimensional change due to tension during printing and processing. Such multilayered-stretched resin films are highly useful as wallpaper.

The stretching ratio is not specifically limited and may be suitably selected based on the objectives and the characteristics of the thermoplastic resin being employed. For example, the stretching ratio is from 1.2 to 12-fold, preferably from 2 to 7-fold, when a homopolymer or copolymer of propylene is employed as the thermoplastic resin.

The stretching temperature is not specifically limited. However, stretching is desirably conducted at a temperature that is at least 5° C. (preferably 10° C.) lower than the melting point of the thermoplastic resin employed in back layer (B). When not at least 5° C. lower, the sheets stick to the surface of the rolls during roll stretching, and tend to adhere to the surface of the stretched film. Further, cracks formed by the generation of voids in back layer (B) decrease in number, causing the liquid absorption capability to decrease. When directly hanging wallpaper on a wall, drying of the water-soluble adhesive tends to fail and adhesion during application tends to greatly decrease.

The multilayered-stretched resin film of the present invention may be heat treated at a temperature higher than the stretching temperature as needed. The heat treatment method is not specifically limited, and may be suitably selected based on the objective, characteristics of the resin employed, and stretching method.

Following stretching, the multilayered-stretched resin film has minute voids. The porosity of the multilayered-stretched resin film of the present invention is desirably from 10 to 60 percent, preferably from 15 to 50 percent. In the present specification, the porosity that is given was calculated from the area ratio using an image analyzer (Model Luzex IID, made by Nireko (K.K.)) to analyze the holes in an area observed in a photograph taken by electron microscopy.

When the porosity of the multilayered-stretched resin film is less than 10 percent, the liquid (water) absorption capability tends to be inadequate when employing a water-soluble adhesive. When the porosity exceeds 60 percent, the liquid (water) absorption capability tends to be excessively high, with a large quantity of adhesive penetrating into the layers. This then necessitates the use of a large amount of adhesive and tends to increase costs during application.

As set forth above, the porosity of back layer (B) is desirably greater than that of front layer (A). When the porosity of front layer (A) is greater, there are problems with recycling properties, suitability of the front layer to printing, and front surface strength.

The density of the multilayered-stretched resin film of the present invention is desirably from 0.4 to 1 $g/cm^3$, preferably from 0.45 to 0.95 $g/cm^3$. The multilayered-stretched resin film of the present invention is particularly desirable in the form of an opaque white film having voids.

The multilayered-stretched resin film of the present invention may be employed as is or laminated onto a separate thermoplastic film for use. For example, another thermoplastic resin film may be laminated onto front layer (A) of the multilayered-stretched resin film of the present invention. Examples of laminate films are transparent and opaque films in the form of polyester films, polyamide films, and polyolefin films.

To improve the suitability for printing of the front layer (A), it may be subjected to various oxidation treatments or coated with antistatic agents, anchor coating agents, and water-repelling agents.

To improve the hydrophilic property of the back layer (B) and adhesion to the water-soluble adhesive, various oxidation treatments may be conducted. Examples of oxidation treatments are corona discharge treatment, plasma treatment, flame treatment, glow-discharge treatment, ozone treatment, and the like. Corona discharge treatment and flame treatment are preferred.

Printing may be conducted on the surface of the multilayered-stretched resin film of the present invention based on the intended use. The type and method of printing is not specifically limited. For example, known printing methods such as gravure printing, flexo printing, silk-screen printing, and offset printing employing an ink in which a pigment has been dispersed in a known vehicle may be employed. Printing may also be conducted by metal evaporation, gloss printing, matte printing, or the like. The print pattern may be suitably selected from among natural patterns such as stone textures, wood grains, grids, waterdrops, and flower patterns, as well as abstract patterns such as characters.

The multilayered-stretched resin film of the present invention may be embossed. Embossing is generally conducted after printing, but printing may be conducted following embossing.

For example, the embossing may be conducted by imparting the uneven shape of an embossing plate by means of heat or pressure with a lithographic press, roll embosser, or some other known press or embosser. In roll embossing, the uneven shape of a cylindrical embossing plate is imparted to the material by heat and pressure. When imparting a shape by heat and pressure, heating is controlled to between the thermal deformation temperature and the melting temperature of the resin employed in front layer (A) of the multilayered-stretched resin film, the embossing plate is pressed against the surface of the multilayered-stretched resin film to impart its shape, and the material is cooled to fix the shape. The heating method employed may be, for example, infrared irradiation, blowing hot air, heat transfer by heated rollers, and induction heating. Imparting of an embossed shape may also be achieved without the use of heat by methods employing pressure alone, or imparting an embossed shape either before or after stretching at the same time as film molding without the use of an embosser.

When employing the multilayered-stretched resin film of the present invention to various decorative panels and fire-retardant composite sheets, conducting wiping after embossing to fill the interior of depressions with wiping ink permits greater creativity. This is particularly effective in reproducing the external appearance of wood grain on tubular members.

Further, in addition to wiping, a surface protective layer comprised of a transparent resin layer can be formed on the outermost layer. The surface protective layer functions both to protect the outer surface layer and to impart a sense of perslective to the lower layer printing or embossed designs. Accordingly, even when employing the multilayered-stretched resin film of the present invention in decorative panels and fire-retardant composite sheets, a surface protective layer is particularly useful.

The surface protective layer may be formed by coating or bonding. To further enhance the physical characteristics of the outer surface, a transparent or colored transparent resin with physical surface characteristics such as good weather resistance, abrasion resistance, and pollution resistance is desirably employed. Preferred examples of such resins are various acrylates, polyesters, radiation-setting resins, polyurethane, two-component hardening resins such as unsaturated polyesters, fluorine resins, and polysiloxane resins. Known antibacterial agents, mildew-combatting agents, fragrance materials, and the like may be blended into the outer surface protective layer.

Suitability of the Multilayered-Stretched Resin Film

Adhesive may be directly applied to the back side of the multilayered-stretched resin film of the present invention, which may then be directly adhered to wooden wall materials, gypsum board, various composition materials (including resin-treated decorative panels and gypsum boards), and metal sheets such as iron and aluminum sheets. Thus, when employing the multilayered-stretched resin film of the present invention in wallpaper or the like, it is not necessary to provide a backing material (natural paper or the like) on the back side. Thus, when the multilayered-stretched resin film of the present invention that has been hung as wallpaper is peeled off the wall, it can be recycled as a single material because no backing (natural paper or the like) has been mixed into the original material being recycled.

The adhesive employed to hang the multilayered-stretched resin film of the present invention is not specifically limited; water-soluble adhesives, carbohydrate adhesives, synthetic resin adhesives, and the like may be employed. The adhesive may be soluble in a solvent or water. From the perspectives of ease of operation and stability problems (toxicity, fires, and the like due to vaporizing of solvent), the use of a water-soluble adhesive is preferred.

There are water-soluble adhesives that have the property of dissolving or swelling in water. Examples are protein-based adhesives such as gelatin, glue, and casein.

Examples of carbohydrate adhesives are starch and derivatives thereof, and cellulose derivatives such as hydroxyethyl cellulose, ethylhydroxyethyl cellulose, carboxymethyl cellulose (CMC), and viscose. Further examples are gum Arabic and gum traganth.

Examples of synthetic resin adhesives are polyvinyl alcohol, polyvinyl ether, and polyvinyl pyrrolidone. Further examples are polyacryl amide, polyethylene oxide, polyvinyl amide, water-soluble polyurethane, polyacrylic acid resins, and salts thereof. Emulsion-based adhesives obtained by emulsion polymerization of vinyl acetate, acrylic ester, ethylene vinyl acetate, vinyl chloride, and the like are also examples of adhesives.

Of these, the use of a water-soluble adhesive such as a starch or a derivative thereof, polyacrylic acid, polyacryl amide, polyethylene oxide, polyvinyl alcohol, carboxymethyl cellulose (CMC), vinyl acetate, or polyvinyl amide is desirable from the perspectives of application and adhesion when hanging the multilayered-stretched resin film of the present invention on a wall or the like. Starches and their derivatives are the adhesives of preference.

When the multilayered-stretched resin film of the present invention has been peeled off the wall, water-absorbant back layer (B) remains on the wall surface. When a water-soluble adhesive is directly coated on back layer (B) of the multilayered-stretched resin film of the present invention, adequate adhesion is achieved by hanging directly onto the back layer (B) remaining on the wall surface. That is, it is not necessary to first peel off the back layer (B) remaining on the wall before hanging a new multilayered-stretched resin film. The back layer (B) remaining on the wall surface can be used for rehanging any number of times.

The multilayered-stretched resin film of the present invention is particularly useful as wallpaper, decorative panels, and decorative paper for flame-retardant composite sheets. It is also useful in flooring materials, the internal furnishings of automobiles, and in pressure sensitive adhesive labels treated for adhesiveness.

EXAMPLES

Examples, comparative examples, and test examples are given below to specifically describe the characteristics of the present invention. The materials, quantities employed, ratios, processing contents, and procedures described in the examples below can be suitably modified without departing from the essence of the present invention. Thus, the scope of the present invention is not to be interpreted as being limited to the specific examples given below.

Tables 1 and 2 give the materials employed in the examples and comparative examples below. "MFR" in the tables stands for melt flow rate.

TABLE 1

| Material | Composition |
| --- | --- |
| Thermoplastic resin (a) | Ethylene - propylene random copolymer (product name "Novatec PP X1804" made by Japan Polychem (K.K.)) with MFR of 6 g/10 min (230° C., 2.16 kg load), melting point 137° C. (DSC peak temperature). |
| Thermoplastic resin (b) | High-density polyethylene (product name "Novatec HD HJ360" made by Japan Polychem (K.K.)) with MFR of 5.5 g/ 10 min (190° C., 2.16 kg load), melting point 131° C. (DSC peak temperature). |
| Thermoplastic resin (c) | Ethylene - propylene random copolymer (product name "Novatec PP FG3D" made by Japan Polychem (K.K.)) with MFR of 7 g/10 min (230° C., 2.16 kg load), melting point 145° C. (DSC peak temperature). |

TABLE 1-continued

| Material | Composition |
|---|---|
| Thermoplastic resin (d) | Propylene homopolymer (product name "Novatec PP FY4" made by Japan Polychem (K.K.)) with MFR of 5 g/10 min (230° C., 2.16 kg load), melting point 164° C. (DSC peak temperature). |
| Thermoplastic resin (e) | Propylene homopolymer (product name "Novatec PP FY6H" made by Japan Polychem (K.K.)) with MFR of 1.9 g/10 min (230° C., 2.16 kg load), melting point 164° C. (DSC peak temperature). |
| Thermoplastic resin (f) | Linear low-density polyethylene (product name "Novatec LL UF240" made by Japan Polychem (K.K.)) with MFR of 2.1 g/10 min (190° C., 2.16 kg load), melting point 128° C. (DSC peak temperature). |
| Elastomer (a) | Olefin thermoplastic elastomer (product name "Zelas" made by Mitsubishi Chemical) with MFR of 5.0 g/10 min (230° C., 2.16 kg load), melting point 170° C. (DSC peak temperature). |
| Elastomer (b) | Olefin thermoplastic elastomer (product name "Thermorun" made by Mitsubishi Chemical) with MFR of 3.6 g/10 min (230° C., 2.16 kg load), melting point 152° C. (DSC peak temperature). |
| Hydrophilic resin (1) | Polyester polyol resin (product name "Paoson", made by Daiichi Kogyo Seiyaku Co., Ltd.) |
| Hydrophilic resin (2) | Polyether ester amide resin (product name "Witistat", made by Sanyo Kasei Co., Ltd.). |
| Inorganic finepowder (alpha 1) | Calcium carbonate dry comminuted to an average particle diameter of 1.2 micrometers (product name Softon 3200 made by Bihoku Hunka Kogyo (K.K.)). |
| Inorganic finepowder (alpha2) | Calcium carbonate dry comminuted to an average particle diameter of 1.8 micrometers (product name Softon 2200 made by Bihoku Hunka Kogyo (K.K.)). |
| Inorganic finepowder (beta) | Calcium carbonate dry comminuted to an average particle diameter of 8 micrometers (product name "BF100" made by Bihoku Hunka Kogyo (K.K.)). |
| Inorganic finepowder (gamma) | Calcium carbonate (product name "AFF" made by Fimatec Ltd.) with an average particle diameter of 1.2 micrometers treated with a water-soluble cationic surfactant during wet comminution and surface treated with an anionic antistatic agent. |

TABLE 2

| Material | Composition |
|---|---|
| Water-soluble adhesive ((1)) | Starch-based adhesive (product name "Rua Mild" made by Yayoi Chemicals). |
| Water-soluble adhesive ((2)) | Starch-based adhesive (product name "Paradyne" made by Yazawa Chemicals). |
| Water-soluble adhesive ((3)) | Vinyl acetate adhesive (product name "AC500" made by Chuo Rika). |

Example 1 to 6 and Comparative Examples 1 and 2

Multilayered-stretched resin films of the present invention (Examples 1 to 6) and multilayered-stretched resin films for comparison (Comparative Examples 1 and 2) were manufactured by the following procedure and employed to manufacture wallpaper. Comparative Example 1 is identical to the multilayered-stretched resin film of Example 1 in Japanese Unexamined Patent Publication (KOKAI) Heisei No. 11-348192.

Thermoplastic resin, elastomer, and inorganic finepowder were admixed to prepare composition (A) for front layer (A). Thermoplastic resin, hydrophilic thermoplastic resin, elastomer, and inorganic finepowder were admixed to prepare composition (B) for back layer (B). For Examples 4 to 6 and Comparative Examples 1 and 2, thermoplastic resin, hydrophilic thermoplastic resin, elastomer, and inorganic finepowder were admixed to prepare composition (C) for intermediate layer (C). The respective materials and blending quantities were as indicated in Table 3.

When only compositions (A) and (B) were prepared, they were melted and kneaded in two extruders set to 250° C., the two compositions were laminated in a die, the laminate was extrusion molded and cooled to 70° C. with a cooling device to obtain a two-layer unstretched sheet.

When compositions (A), (B), and (C) were prepared, the compositions were separately melted and kneaded in three extruders set to 250° C. Composition (A) was laminated on the front surface side of composition (C) and composition (B) was laminated on the back surface side of composition (C). Extrusion molding was conducted, and the sheet was cooled to 70° C. with a cooling device to obtain a three-layer unstretched sheet.

The unstretched sheets that were formed were heated to the stretching temperatures indicated in Table 3 and stretched to the ratios indicated in Table 3 between longitudinal rolls. However, in Example 4, a three-layer structure unstretched sheet was heated to 130° C., stretched five-fold between rolls in the longitudinal direction, heated to 155° C., and then stretched nine-fold in the traverse direction with a tenter stretching device to obtain a biaxially-stretched film. Stretching was not conducted in Comparative Example 2.

Next, both surfaces of the stretched films obtained were corona discharge treated at 50 W/m²·min using a discharge processor (made by Kasuga Electronics (Ltd.)) to obtain multilayered-stretched resin films. The porosities of the individual layers, overall porosities and densities in the multilayered-stretched resin films obtained are given in Table 4.

After gravure printing a flower pattern (ink: product name "CCST" made by Toyo Ink Mfg. Co., Ltd.) on front layer (A) of each of the multilayer-stretched films, a silk surface pattern was embossed with embossing rolls 0.5 mm in depth heated at 100° C. to obtain a wallpaper.

The water-soluble adhesives (1:1 diluted mixture with water) indicated in Table 4 were applied with an automatic wallpaper paster to the back layer (B) of the multilayered-stretched resin films, and the pasted paper was immediately hung on the surface on a gypsum board wall surface.

Comparative Examples 3 and 4

In addition to the above-described multilayered-stretched resin film, a vinyl acetate adhesive (product name "AC-500", made by Chuo Rika) was coated on the back layer (B) of the three-layer structure unstretched film obtained in Comparative Example 2 and a natural paper backing (basis weight: 80 g/m$^2$) was adhered to prepare Comparative Example 3. A commercial PVC wallpaper with natural paper backing was employed as Comparative Example 4.

The front layer (A) of Comparative Example 3 and the side of Comparative Example 4 without the natural paper backing were gravure printed with a flower pattern (ink: product name "CSST" made by Toyo Ink Mfg. Co., Ltd.) and a silk surface pattern was embossed with embossing rolls 0.5 mm in depth heated at 100° C. to obtain wallpapers.

The water-soluble adhesive (1:1 diluted mixture with water) indicated in Table 4 was applied with an automatic wallpaper paster the paper backing side of Comparative Example 3 and 4, and the pasted papers were immediately hung on a gypsum board surface.

Test Examples

The various multilayered-stretched resin films and wallpapers prepared were evaluated by the following tests.
1) Contact Angle of Water
The contact angles of water of the back layers (B) of the various stretched resin films prepared in Examples 1 to 6 and Comparative Examples 1 and 2 were measured ten times with a contact angle meter (Model CA-D, made by Kyowa Interface Science Co., Ltd.) using ion-exchange water and the average values were calculated.
2) Liquid Water Absorption Volume
The liquid water absorption volume of the back layer (B) side of the various multilayered-stretched resin films prepared in Examples 1 to 6 and Comparative Examples 1 to 4 were measured in accordance with Japan TAPPI No. 51-87 (Paper Pulp Technology Association, Paper Pulp Test Method No. 51-87, Bristow method). That is, a Bristow Tester II made by Kumagaya Riki Kogyo (K.K.) was employed to add dropwise 20 microliters of a 1:20 mixed solution of red water-based ink in ion-exchange water in a nonpressurized state, and the liquid water absorption volume was obtained at 50 (T ½ ms).
3) Peel Strength
Adhesive tape (product name "Cellotape" made by Nichiban (K.K.)) was applied to the back layer (B) side of the various multilayered-stretched resin films prepared in Examples 1 to 6 and Comparative Examples 1 and 2. This was then cut to a width of 10 mm and a length of 100 mm. Twenty-four hours later, a tension tester (product name "Autograph", made by Shimadzu Corporation) was employed to peel off the tape at an angle of 180 degrees at a pull rate of 1,000 mm/min and the peel strength was measured.

4) Suitability for Printing
Adhesive tape (product name "Cellotape" made by Nichiban (K.K.)) was applied to the ink surface of various gravure printed multilayered-stretched resin films and pressed well into place. The adhesive tape was then peeled off at an angle of 90 degrees at a constant rate and ink removal was measured based on the following scale:
⊚: No ink removed
O: The film material was damaged, but there were no practical problems.
Δ: Most of the ink peeled off, but there was resistance during peeling; practical problems present.
X: All ink separated, and there was no resistance during peeling. Practical use precluded.
5) Suitability for Embossing
(Evaluation of Embossing)
The irregularities of the embossed surfaces (front layer (A)) of various embossed wallpapers were observed under a magnifying glass at ten-fold magnification and evaluated on the following scale:
O: Sense of perspective present, sharp.
Δ: Sense of perspective present, but sharpness somewhat lacking. No practical problem.
X: Depth and sharpness both lacking. Practical use precluded.
(Evaluation of Embossing Reversion)
Water-soluble adhesive (1) indicated in Table 2 was diluted 1:1 with water and applied in suitable quantity with a brush to the back layer (B) side of each of the embossed wallpapers and the wallpapers were hung on a gypsum board surface in a manner preventing the entry of air. Two sheets of board were stacked with the sides on which wallpaper had been hung facing each other, the boards were placed in a 60° C. dryer, and 300 kg/m$^2$ of pressure was applied for 3 min. The boards were then removed and the embossing was visually evaluated on the following scale:
⊚: No change
O: Slight decrease in the sense of perspective, but no practical problem.
Δ: Lack of sense of perspective, embossing reversion clearly present, some practical problem.
X: Embossing nearly gone, practical use precluded.
6) Ease of Hanging
(Handling Properties)
The various water-soluble adhesives indicated in Table 4 were diluted 1:1 with water and applied over an area of 90×180 cm with an automatic wallpaper paster (made by Kyokuto Sanki K.K.) to the back layer (B) side (the paper backing side when a paper backing was present) of each of the wallpapers and the wallpapers were quickly hung on a gypsum board wall surface. The handling properties of this series of operations were evaluated on the following scale.
O: No wrinkling due to pasting, went on continuously and cleanly.
Δ: Some wrinkling due to pasting, time required for hanging, some practical problems.
X: Heavy wrinkling due to pasting, did not hang cleanly on the wall, precluding practical use.
(Drying Properties)
The various water-soluble adhesives indicated in Table 4 were diluted 1:1 with water and applied over an area of 90×180 cm with an automatic wallpaper paster (made by Kyokuto Sanki K.K.) to the back layer (B) side (the paper backing side when a paper backing was present) of each of the wallpapers and the wallpapers were quickly hung on a gypsum board wall surface. The handling properties of this series of operations were evaluated on the following scale.

O: The same drying property was exhibited as the natural paper backing, and handling was easy.

Δ: Drying was poorer than for a natural paper backing, and handling was problematic.

X: Drying was poorer than for a natural paper backing, precluding practical use.

(Ease of Rehanging)

The various water-soluble adhesives indicated in Table 4 were diluted 1:1 with water and applied with an automatic wallpaper paster (made by Kyokuto Sanki K.K.) to the back layer (B) side (the paper backing side when a paper backing was present) of each of the wallpapers and the wallpapers were quickly hung on a gypsum board wall surface. After seven days had elapsed, the various multilayered-stretched resin films were peeled off the wall. Consequently, the various water-soluble adhesives indicated in Table 4 were diluted 1:1 with water and applied with an automatic wallpaper paster (made by Kyokuto Sanki K.K.) to the peeled surfaces of the various multilayered-stretched resin films that had been peeled off and the wallpapers were quickly hung on a gypsum board wall surface. After seven days had elapsed, adhesives tape (product name "Cellotape", made by Nichiban (K.K.)) was adhered to each of the multilayered-stretched resin films, adequate pressure was applied, the wallpaper was cut to the width of the tape with knife, the adhesive tape was pulled by hand from the gypsum board panel at an angle of 90 degrees at a fixed rate, and an evaluation was conducted on the following scale:

O: Resistance present during peeling, peeled away from the back layer (B) portion.

Δ: Resistance present but weak during peeling when peeled from the readhered surface, with partial separation of back layer (B) form the readhered surface. Practical problems present.

X: Back layer (B) peeled away form the readhered surface and there was little resistance during peeling. Practical use was precluded.

7) Suitability for Recycling

Various wallpapers that had been hung were peeled off after one month had elapsed, the peeled wallpaper was placed in a pulverizer and chipped. The mass was again melted and extruded by a twin-screw extruder equipped with a 100-mesh screen pack where the temperature was set to 60° C. higher than the melting point of the high-melting-point resin material employed. The second melt extrusion (regeneration) was evaluated as being possible or impossible based on clogging of the screen pack, smoking from an extruder, and change in color of the recycled resin as a result of this process.

The results of the above test examples are presented in Table 4.

TABLE 3

| | | Composition | | | | | | | | | | | | |
|---|---|---|---|---|---|---|---|---|---|---|---|---|---|---|
| | | Front surface layer (A) | | | | | | Back surface layer (B) | | | | | | |
| | | Thermoplastic resin | | Elastomer | | Finepower | | Thermoplastic resin | | Elastomer | | Hydrophilic resin | | Finepowder | |
| | | type | ratio (wt %) | type | ratio (wt %) | type | ratio (wt %) | type | ratio (wt %) | type | ratio (wt %) | type | ratio (wt %) | type | ratio (wt %) |
| Ex. | 1 | a | 30 | a | 20 | α1 | 50 | d | 25 | a | 20 | 1 | 5 | γ | 50 |
| | 2 | b | 35 | b | 15 | β | 50 | d | 20 | a | 25 | 1 | 10 | γ | 45 |
| | 3 | a | 45 | a | 30 | α1 | 25 | d | 10 | a | 25 | 2 | 5 | γ | 60 |
| | 4 | f | 35 | a | 10 | α1 | 55 | d | 30 | a | 15 | — | — | γ | 55 |
| | 5 | a | 40 | b | 25 | β | 35 | e | 10 | a | 15 | 1 | 10 | γ | 65 |
| | 6 | a | 30 | a | 20 | α1 | 50 | d | 25 | a | 20 | 1 | 5 | γ | 50 |
| Comp. Ex. | 1 | a | 40 | b | 10 | α1 | 50 | e | 35 | b | 5 | — | — | γ | 60 |
| | 2 | a | 30 | a | 20 | α1 | 50 | d | 25 | a | 20 | 1 | 5 | γ | 50 |

| | | Composition Intermediate layer (C) | | | | | | | | | | |
|---|---|---|---|---|---|---|---|---|---|---|---|---|
| | | Thermoplastic resin | | Elastomer | | Hydrophilic resin | | Finepowder | | Stretching conditions | | |
| | | type | ratio (wt %) | type | ratio (wt %) | type | ratio (wt %) | type | ratio (wt %) | direction | temp (° C.) | ratio (fold) |
| Ex. | 1 | — | — | — | — | — | — | — | — | uniaxial | 120 | 5 |
| | 2 | — | — | — | — | — | — | — | — | uniaxial | 130 | 4 |
| | 3 | — | — | — | — | — | — | — | — | uniaxial | 130 | 6 |
| | 4 | d | 40 | a | 33 | 1 | 2 | γ | 25 | biaxial | 130/155 | 5 × 9 |
| | 5 | d | 32 | a | 43 | 1 | 10 | γ | 15 | uniaxial | 125 | 5 |
| | 6 | d | 20 | a | 45 | 1 | 10 | γ | 25 | uniaxial | 140 | 5 |
| Comp. Ex. | 1 | c | 50 | b | 20 | — | — | α2 | 30 | uniaxial | 125 | 5 |
| | 2 | d | 50 | b | 20 | 1 | 15 | γ | 15 | not stretched | — | — |

TABLE 4

| | | Multilayered-stretch resin film | | | | | | | Evaluation | | |
|---|---|---|---|---|---|---|---|---|---|---|---|
| | | Porosity (%) | | | | Density (g/cm³) | Water contact angle of layer (B) (°) | Peel strength of layer (B) (g/cm) | Water absorbance volume (mL/m²) of Layer (B) | Printing suitability Ability to adhere to ink of layer (A) | Embossing suitability | |
| | | Layer (A) | Layer (B) | Layer (C) | Total | | | | | | Ability to take embossing | Reversion |
| Ex. | 1 | 20 | 40 | — | 34 | 0.84 | 30 | 92 | 20 | ○ | ○ | ⊚ |
| | 2 | 18 | 39 | — | 30 | 0.91 | 35 | 110 | 15 | ⊚ | ○ | ⊚ |
| | 3 | 25 | 52 | — | 39 | 0.66 | 20 | 65 | 32 | ⊚ | ○ | ○ |
| | 4 | 28 | 57 | 48 | 51 | 0.47 | 16 | 40 | 42 | ○ | ○ | Δ |
| | 5 | 23 | 52 | 44 | 49 | 0.68 | 25 | 75 | 30 | ○ | ○ | ○ |
| | 6 | 5 | 33 | 18 | 26 | 0.97 | 50 | 165 | 8 | ⊚ | Δ | ⊚ |
| Comp. Ex. | 1 | 15 | 40 | 33 | 31 | 0.85 | 55 | 95 | 5 | ○ | ○ | ⊚ |
| | 2 | 1 | 1 | 1 | 1 | 1.24 | 88 | 350 | 1 | Δ | Δ | X |
| | 3 | Natural paper employed as backing in Comp. Example 2 | | | | — | — | — | 45 | Δ | Δ | X |
| | 4 | Commercial PVC foam wallpaper | | | | — | — | — | 55 | — | — | — |

| | | | Evaluation | | | | |
|---|---|---|---|---|---|---|---|
| | | | Ease of hanging | | | Recycling properties | |
| | | Adhesive | handling property | Drying property | Rehanging property | Permitted remelting | Condition of extruding |
| Ex. | 1 | (1) | ○ | ○ | ○ | Yes | Good |
| | 2 | (1) | ○ | ○ | ○ | Yes | Good |
| | 3 | (1) | ○ | ○ | ○ | Yes | Good |
| | 4 | (2) | ○ | ○ | ○ | Yes | Good |
| | 5 | (3) | ○ | ○ | ○ | Yes | Good |
| | 6 | (2) | ○ | ○ | ○ | Yes | Good |
| Comp. Ex. | 1 | (1) | X | Δ | Δ | Yes | Good |
| | 2 | (1) | X | X | X | Yes | Good |
| | 3 | (1) | Δ | ○ | *Δ | No | Clogged |
| | 4 | (1) | ○ | ○ | *X | No | Clogged |

Note:
Items in the Rehanging column with an * denote that the natural paper backing served as the readhesion surface.

INDUSTRIAL APPLICABILITY

The multilayered-stretched resin film of the present invention affords good properties as wallpaper, such as suitability for printing and embossing. Further, the wallpaper is readily applied to a wall surface or the like due to the imparting of the water absorption of a water-soluble adhesive to back layer (B). Further, the peel strength of back layer (B) of the multilayered-stretched resin film of the present invention is set to from 10 to 200 g/cm, causing the back layer (B) portion to remain on the wall surface when the wallpaper is peeled off. Thus, the peeled multilayered-stretched resin film does not contain other materials such as a natural paper backing, pressure-sensitive adhesive, or water-soluble adhesive, permitting recycling without the separation of such materials. Further, rehanging on the wall surface from which the wallpaper has been peeled is possible by reapplying a water-soluble adhesive, rendering the multilayered-stretched resin film of the present invention extremely useful as an interior design material.

What is claimed is:
1. A multilayered-stretched resin film comprising:
a printable front layer (A) comprising a wall paper display and having at least one of a thermoplastic resin, an inorganic finepowder, and an organic filler, and
a back layer (B) laminated on a back surface of said printable front layer (A), said back layer for securing the printable front layer to a wall,
wherein
said back layer (B) comprises a surface-treated inorganic fine powder and a thermoplastic resin comprising a hydrophilic thermoplastic resin,
said front layer (A) has a peel strength to back layer (B) of 30 to 150 g/cm,
said back layer has a liquid water-absorption volume as measured by Japan TAPPI NO. 51-87 of 6 to 50 mL/m²,
said back layer (B) comprises from 3 to 200 weight parts of said hydrophilic thermoplastic resin per 100 weight parts of nonhydrophilic thermoplastic resin; and
said back layer comprises a detachable surface with the front layer to permit removal of the front layer from the wall while preserving said back layer on the wall for reuse.
2. The multilayered-stretched resin film according to claim 1 wherein said hydrophilic thermoplastic resin comprises at least one resin selected from the group consisting of polyvinyl resins, polyacrylic-based resins and salts thereof, hydrolytes of copolymers of vinyl acetate and methyl methacrylate, water-soluble nylon, urethane resins, polyalkylene oxide resins, polyether amides, polyether ester amides, polyvinyl amines, polyallyl amines and polyester polyol resins.

3. The multilayered-stretched resin film according to claim 1 wherein said thermoplastic resin is an olefin-based resin, an olefin-based thermoplastic elastomer, or a mixture of an olefin-based resin and an olefin-based thermoplastic elastomer.

4. The multilayered-stretched resin film according to claim 3 wherein said mixture of olefin-based resin and olefin-based thermoplastic elastomer comprises from 10 to 300 weight parts of olefin thermoplastic elastomer per 100 weight parts of olefin-based resin.

5. The multilayered-stretched resin film according to claim 3 wherein the melting point of said olefin-based thermoplastic elastomer is greater than or equal to 160° C.

6. The multilayered-stretched resin film according to claim 1 wherein said hydrophilic thermoplastic resin is an alkylene oxide polymer.

7. The multilayered-stretched resin film according to claim 1 wherein the surface of the inorganic finepowder employed in back layer (B) is treated with at least one selected from the group consisting of anionic surfactants, cationic surfactants, nonionic surfactants, and antistatic agents.

8. The multilayered-stretched resin film according to claim 1 wherein the porosity of said multilayered-stretched resin film is from 10 to 60 percent.

9. The multilayered-stretched resin film according to claim 1 wherein the porosity of back layer (B) is greater than the porosity of front layer (A).

10. The multilayered-stretched resin film according to claim 1 wherein the average contact angle of water of back layer (B) is from 10 to 80°.

11. The multilayered-stretched resin film according to claim 1 wherein the density of the multilayered-stretched resin film is from 0.4 to 1 g/cm$^3$.

12. The multilayered-stretched resin film according to claim 1 which is prepared by laminating front layer (A) and back layer (B) and then stretched the laminate.

13. The multilayered-stretched resin film according to claim 12 wherein both front layer (A) and back layer (B) are stretched in at least one axial direction.

14. The multilayered-stretched resin film according to claim 1 wherein front layer (A) and back layer (B) are subjected to oxidation treatment.

15. The multilayered-stretched resin film according to claim 1 wherein front layer (A) is printed and then embossed.

16. The multilayered-stretched resin film according to claim 1 wherein the multilayered-stretched resin film is used for adhesive application and a water-soluble adhesive is coated on back layer (B).

17. The multilayered-stretched resin film according to claim 16 wherein said water-soluble adhesive is one selected from the group consisting of starch, polyacrylic acid, polyacrylamide, polyethylene oxide, polyvinyl alcohol, carboxymethyl cellulose, vinyl acetate, and polyvinyl amide.

18. The multilayered-stretched resin film according to claim 1, wherein said hydrophilic thermoplastic resin comprises at least one resin selected from the group consisting of polyvinyl resins, polyacrylic-based resins and salts thereof, hydrolytes of copolymers of vinyl acetate and methyl methacrylate, water-soluble nylon, polyether amides, polyether ester amides, polyvinyl amines, polyallyl amines and polyester polyol resins.

19. The multilayered-stretched resin film according to claim 1, wherein said hydrophilic thermoplastic resin comprises at least one resin selected from the group consisting of polyester polyol resins and polyether ester amide resins.

20. A multilayered-stretched resin film comprising:
a printable front layer (A) comprising a wall paper display and including at least one of a thermoplastic resin, an organic fine powder, and an organic filler; and
a back layer (B) laminated on a back surface of said printable front layer (A), wherein:
said back layer (B) comprises a surface-treated inorganic fine powder and a thermoplastic resin comprising a hydrophilic thermoplastic resin,
said back layer (B) comprises an olefin-based thermoplastic elastomer having a melting point of from 165 to 180° C. in an amount of 15 to 25% by weight of the back layer (B),
said front layer (A) has a peel strength to back layer (B) of 30 to 150 g/cm,
said back layer has a liquid water-absorption volume as measured by Japan TAPPI NO. 51-87 of 6 to 50 mL/m$^2$,
said back layer (B) comprises from 3 to 200 weight parts of said hydrophilic thermoplastic resin per 100 weight parts of nonhydrophilic thermoplastic resin, and
said back layer comprising a detachable surface permitting removal of the front layer from a wall while preserving said back layer on the wall for reuse.

21. The multilayered-stretched resin film according to claim 1, wherein
said back layer forms a detachable surface permitting removal of the front layer from a wall while preserving said back layer for reuse.

22. A two-part detachable resin film for application to a surface holding the resin film, comprising:
a printable front layer (A) comprising a display item and including at least one of a thermoplastic resin, an inorganic finepowder, and an organic filler, and
a back layer (B) laminated on a back surface of said printable front layer (A), wherein
said back layer (B) comprises a surface-treated inorganic fine powder and a thermoplastic resin comprising a hydrophilic thermoplastic resin,
said front layer (A) has a peel strength to back layer (B) of 30 to 150 g/cm,
said back layer has a liquid water-absorption volume as measured by Japan TAPPI NO. 51-87 of 6 to 50 mL/m$^2$,
said back layer (B) comprises from 3 to 200 weight parts of said hydrophilic thermoplastic resin per 100 weight parts of nonhydrophilic thermoplastic resin, and
said back layer comprises a detachable surface permitting removal of the front layer from a surface while preserving said back layer on the surface for reuse.

* * * * *

UNITED STATES PATENT AND TRADEMARK OFFICE
CERTIFICATE OF CORRECTION

PATENT NO. : 9,486,986 B2  
APPLICATION NO. : 11/555912  
DATED : November 8, 2016  
INVENTOR(S) : Yamanaka et al.

Page 1 of 1

It is certified that error appears in the above-identified patent and that said Letters Patent is hereby corrected as shown below:

On the Title Page

Item (30), the Foreign Application Priority Data is omitted. Item (30) should read:  
(30)    Foreign Application Priority Data  
Sep. 21, 2000   (JP)....................2000-286266  
Oct. 31, 2000   (JP)....................2000-332690

Signed and Sealed this  
Sixth Day of November, 2018

Andrei Iancu  
*Director of the United States Patent and Trademark Office*